United States Patent [19]
Braithwaite et al.

[11] 3,989,472
[45] Nov. 2, 1976

[54] METHOD FOR PRODUCING HIGH BULK DENSITY MAGNESIUM CHLORIDE

[75] Inventors: David G. Braithwaite, Brookhaven, Miss.; William P. Hettinger, Jr., Sudbury, Mass.

[73] Assignee: NL Industries, Inc., New York, N.Y.

[22] Filed: July 7, 1975

[21] Appl. No.: 593,679

[52] U.S. Cl. .............................. 23/293 A; 23/304; 159/48 R; 159/DIG. 4
[51] Int. Cl.² ............................................. B01J 2/02
[58] Field of Search ............... 23/293 A, 300, 304, 23/305; 252/358; 159/48 R, DIG. 4, DIG. 20, DIG. 31

[56] References Cited
UNITED STATES PATENTS

| | | | |
|---|---|---|---|
| 1,734,260 | 11/1929 | Lamont | 23/293 A X |
| 2,277,827 | 3/1942 | Heath et al. | 23/304 X |
| 2,788,276 | 4/1957 | Reich et al. | 159/48 R X |
| 3,196,930 | 7/1965 | Ebert et al. | 159/48 R |
| 3,346,333 | 10/1967 | Nadler | 423/488 |
| 3,442,628 | 5/1969 | Saunders et al. | 23/300 |
| 3,725,014 | 4/1973 | Poncha et al. | 23/300 |

FOREIGN PATENTS OR APPLICATIONS

| | | | |
|---|---|---|---|
| 1,112,373 | 4/1970 | U.S.S.R. | 23/304 |

*Primary Examiner*—Morris O. Wolk
*Assistant Examiner*—Roger F. Phillips

[57] ABSTRACT

An anti-foaming agent is added to magnesium chloride containing brine prior to spray drying to produce a spray dried product comprising discrete particles of relatively high bulk density.

5 Claims, No Drawings

METHOD FOR PRODUCING HIGH BULK DENSITY MAGNESIUM CHLORIDE

BACKGROUND OF INVENTION

Magnesium chloride is presently used extensively in the production of metallic magnesium by electrolysis of the fused chloride. Widely used sources of magnesium chloride are sea water, salt lakes and similar brines from which a magnesium chloride concentrate is recovered. When this concentrate is heated to drive off the physically combined water, a magnesium chloride hydrate is formed which contains a substantial amount of chemical combined water. It is essential, however, to the recovery of magnesium metal by electrolysis of fused magnesium chloride, that the magnesium chloride feed to the cell be substantially free of water of crystallization, for otherwise $H_2$ will be formed at the cathode; and $O_2$ and compounds of oxygen will be evolved at the anode thus causing rapid erosion of the anodes. Also, any MgO and MgOHCl in the feed must be removed otherwise particulate MgO will form and sink to the bottom of the cell to form a sludge which reduces the operating efficiency of the cell, requires much labor and equipment to remove from the cell, forms irreversible deposits which eventually prevent salt circulation and require cell shut-down and rebuilding, as well as reducing the recovery of metallic magnesium which becomes trapped in the cell "smut" deposits.

One present practice for forming a substantially dry magnesium chloride suitable as a feed material for electrolytic cells is to use a spray-dry unit including cyclone separator. Units of this type are traversed by heated gases having preferably an air inlet temperature of about 1000° F. and an air outlet or discharge temperature of about 500° F. The magnesium chloride concentrate is fed into the inlet of the spray drier and is recovered from the outlet in the form of substantially dry magnesium chloride of no more than about 3–5% water—which, after being further dehydrated in a melt cell, has been found to be sufficiently free of water to be used effectively in electrolytic cells to produce magnesium metal. However, this spray-dried product is a dry, very light, fluffy material, as large as 800 microns in size, thin-walled hollow spheres, fragile and readily fragmented into very thin particles of low bulk density. As the consequence, it is difficult to handle mechanically, store, or to control when feeding into melt cells for forming molten magnesium chloride.

SUMMARY OF INVENTION

Pursuant to studies being made to understand why spray dried materials were consistently fluffy and of low density it was discovered, quite unexpectedly, that the brine at the spray nozzles, prior to being sprayed, had a froathy consistency and that when this foam or froath was eliminated the spray dried material was of considerably higher density.

The present invention is the discovery of a relatively simple and inexpensive method for producing spray dried magnesium chloride of relatively high bulk density wherein a surface active agent, sometimes referred to as an anti-foaming agent, is added to the brine concentrate prior to spray drying. By this relatively simple expedient the bulk densities of spray-dried magnesium chloride brines have been increased from 15 to as high as about 23, or by about 48% (as measured in the cyclone) over the bulk densities of spray-dried magnesium chloride produced in the absence of a surface active agent. Further, the particle size of the spray-dried product is smaller being of the order of from 200 to 400 $\mu$ in diameter with a wall thickness of from 5 to 10 $\mu$ as compared to the spray dried product of the prior art which quite consistently has a diameter of as high as 800 $\mu$ and a wall thickness of about 1 to 2 $\mu$. The product of this invention is, as a consequence, relatively dense and hence more readily handled, as for example when conveying the material to storage areas, compacting or feeding to a melt cell, DC cell, as the case may be.

The particular surface active agents found to be most effective are, in general, organic anti-foaming agents of the fatty acid type and in particular an anti-foaming agent known commercially as Nalco 71-D5 and sold by the Nalco Chemical Company.

This anti-foaming agent is added to the magnesium chloride brine concentrate before the spray drier where its effect is to reduce foaming at the nozzles, the amount of anti-foaming agent added being in the range of from 200 to 1000 ppm on a brine basis depending upon such parameters as the concentration of the brine, the type of anti-foaming agent used, temperature of the brine at the nozzles and similar factors.

PREFERRED EMBODIMENT OF INVENTION

The magnesium chloride containing brines used in carrying out the objects of the present invention are preferably derived from Great Salt Lake brines which have been subjected to solar evaporation in a series of holding ponds whereby a major portion of the sodium chloride is precipitated out; after which the brine is treated with calcium chloride to remove a substantial portion of the sulfate values as a complex salt of potassium sulfate and magnesium chloride known as kanite. The desulfated brine is then concentrated to remove carnallite, a complex salt of potassium and magnesium chloride, as more fully described in U.S. Pat. No. 3,516,785; and the concentrated brine, which now comprises from 35–55% magnesium chloride, is then sent to storage. From storage the brine concentrate, at temperatures of from 170° – 220° F. is fed to the spray driers for dehydrating the brine.

At this point in the process, the desulfated and decarnallited concentrated brine, sometimes referred to hereinafter as a foamable brine, is treated with a surface active agent and in particular an anti-foaming agent which is added to the brine just prior to feeding the brine to the nozzles of the spray drier. At this point in the process, the temperature of the brine is in the range of from 170°–360° F. and the nozzle pressures about 600 lbs./sq. inch.

While any of several organic anti-foaming agents of the type identified above may be used a preferred anti-foaming agent is a liquid mixture of polyglycol and fatty acid type surface active materials sold under the trade name Nalco 71-D5 and comprising, in addition to the polyglycol and fatty acid surface active agents, emulsifying and stabilizing agents—the anti-foaming agent being of a pale straw-color, and having a solidifying point (soft solid) at 45° F, a flash point at 260° F, a viscosity of 13.8 cp at 80° F and density of 7.2 lb./gal. The amount of anti-foaming agent, in terms of parts per million on a brine weight basis, has been found to directly effect the density of the spray dried product; and additions in the range of from 100–500 ppm effect relatively rapid increases in bulk density. Further additions, that is as high as 1000 ppm, effect only slight increases in bulk density, the optimum levels of addition being in the range of from 200–500 ppm.

prior to spray drying. The anti-foaming agent was Nalco 71-D5.

Other operation details of these runs are given in the Table below.

TABLE

|  | 1 STANDARD BRINE NO ADDITIVE | 2 250 ppm SURFACE MODIFIER* AGENT | 3 500 ppm SURFACE MODIFIER* AGENT |
|---|---|---|---|
| % MgCl$_2$ in Brine Feed | 36.3 | 36.3 | 38.8 |
| Brine Temperature-Holding Tank ° F | 220 | 180 | 200 |
| Brine Temperature-Nozzle Inlet, ° F | 170 | 180 | 186 |
| Nozzle Diameter, mm. | 1.1 | 1.1 | 1.1 |
| Dryer Inlet Temperature, ° F | 925 | 952 | 950 |
| Dryer Outlet Temperature, ° F | 495 | 579 | 560 |
| Nozzle Pressure, psig. | 600 | 600 | 600 |
| Brine Feed Rate, gal/min. | 0.6 | 0.45 | 0.63 |
| Bulk Density, Chamber, lbs./ft.$^3$ | 5.0 | 11.0 | 11.9 (138%)** |
| Bulk Density, Cyclone, lbs./ft.$^3$ | 15.0 | 19.0 | 22.2 (48%)** |

*Nalco 71-D5

In this connection, it should be pointed out that the spray dried product is discharged from the spray drier into a chamber in which relatively coarse particles are collected and from which the fines are air borne into a cyclone separator or the like; and that as a result there are at least two fractions, the so-called chamber fraction and the cyclone fraction. The latter is finer than the chamber fraction and is consistently of higher bulk density than the chamber fraction, irrespective of the initial treatment of the brine concentrate. This is especially true when the brine has been treated with an anti-foaming agent according to the present invention. Thus, while treatment of the brine concentrate with 500 ppm, Nalco 71-D5 will produce a chamber fraction having a bulk density of about 12 lbs./cubic foot, the cyclone fraction will have a bulk density of as high as 22 lbs./cubic foot. It is important therefore, in the interest of economy and efficiency, that a major portion of the product produced in the spray drier comprise the fraction recovered from the cyclone separator.

As mentioned above, the brine used in practicing the instant invention is a brine concentrate prepared as described, for example, in U.S. Pat. No. 3,516,785. It will be understood, however, that the use of other magnesium chloride brines are contemplated within the scope of the invention and in particular, deboronated brines prepared as described in copending applications Ser. No. 551,748 filed Feb. 21, 1975; Ser. No. 551,749 filed Feb. 21, 1975; Ser. No. 551,750 filed Feb. 21, 1975 and Ser. No. 564,740 filed Apr. 3, 1975, all said applications having a common assignee with the assignee of the present invention.

The invention will be described further by the following examples.

EXAMPLES 1–3

Three experimental runs were made on a pilot plant scale to illustrate the advance in the art made using the method of this invention. In each of these runs a standard concentrated magnesium chloride brine solution was used i.e. one that had been desulfated, decarnallited and concentrated according to the procedures hereinabove described. The percent magnesium in these foamable brines was in the range of from 9.3 to 9.9 and the magnesium chloride from 36.3 to 38.8%.

The first run was carried out according to standard procedure i.e. no anti-foaming agent was added to the brine. Runs 2 and 3 were made adding 250 ppm and 500 ppm anti-foaming agent, respectively, to the brine From the Table it will be seen that a spray-dried product produced without the benefit of an anti-foaming additive had a bulk density, in the chamber, as low as 5.0 lbs./cubic foot, while the material recovered from the cyclone had a bulk density of only about 15.0 lbs./cubic foot.

In contradistinction the bulk densities of spray-dried products produced by treating the foamable brine with a polyglycol-fatty acid type surface active agent were increased by 138% in the chamber and 48% in the cyclone. Moreover, the size of the chamber fractions produced in Examples 2 and 3 were from ½ to less than ½ the size of the chamber fraction made according to Example 1; and the thickness of the walls about 5 times the wall thickness of the particles made by the standard run. Further, the particles produced in experimental Runs 2 and 3 were relatively hard and brittle. These products were thus comparatively easy to transport to storage bins using conventional conveying means, and easy to feed at controlled rates from storage to melt cells, and/or electrolytic cells, as the case may be—and without plugging, dusting and similar problems.

While the invention has been described and illustrated by the examples included herein it is not intended that the invention be strictly limited thereto and other variations and modifications may be employed within the scope of the appended claims.

We claim:

1. Method for producing substantially anhydrous magnesium chloride of relatively high bulk density from a foamable, magnesium chloride brine solution comprising the steps of: adding an anti-foaming agent to said brine solution in amounts from 200–1000 ppm, said anti-foaming agent comprising a polyglycol fatty acid and then spray drying said solution.

2. Method for producing substantially anhydrous magnesium chloride according to claim 1 wherein said foamable magnesium chloride brine is a desulfated and decarnallited brine concentrate comprising from 35 to 55% magnesium chloride.

3. Method for producing substantially anhydrous magnesium chloride according to claim 2 wherein said brine is deboronated.

4. Method for producing substantially anhydrous magnesium chloride according to claim 1 wherein said anti-foaming agent is Nalco 71-D5.

5. Method for producing substantially anhydrous magnesium chloride according to claim 4 wherein the temperature of the foamable brine concentrate prior to spray drying is in the range of from 170°–360° F.

* * * * *